United States Patent [19]
Webb

[11] 3,753,787
[45] Aug. 21, 1973

[54] SPRING LOADED THERMOCOUPLE UNIT AND MOUNTING CAP THEREFOR

[75] Inventor: Winfield Scott Webb, Deerfield, Ill.

[73] Assignee: Gulton Industries, Inc., Metuchen, N.J.

[22] Filed: Sept. 15, 1971

[21] Appl. No.: 180,795

[52] U.S. Cl................. 136/221, 136/230, 285/138, 285/317
[51] Int. Cl.............................................. H01v 1/02
[58] Field of Search............................ 136/221, 230; 73/259; 285/317, 319, 138; 287/119

[56] References Cited
UNITED STATES PATENTS

| | | | |
|---|---|---|---|
| 3,516,873 | 6/1970 | Bonkowski et al. | 136/221 |
| 3,309,237 | 3/1967 | Kelchner et al. | 136/221 |
| 2,405,076 | 7/1946 | Vollrath | 136/221 |
| 2,208,023 | 7/1940 | Ellis | 136/221 X |
| 2,450,871 | 10/1948 | Adair | 136/230 X |

*Primary Examiner*—Harvey E. Behrend
*Attorney*—Wallenstein, Spangenberg, Hattis & Strampel

[57] ABSTRACT

There is combined with a thermocouple unit, having a coil spring encircling and mounted on at least the front end portion thereof so the spring can be compressed forwardly while the front end of the thermocouple unit is pressed against the inner wall of a bore, a mounting cap having a longitudinally extending passageway. The mounting cap has means for attaching the same at the outer end of the bore and a retractable abutment means which is most advantageously an inwardly extending and resiliently urged member extending laterally across at least part of the mounting cap passageway and connecting with a lift handle on the outside of the mounting cap which is raised to retract the abutment to permit the thermocouple unit to be quickly and easily moved within the mounting cap passageway and pressed against the end of the bore while maintaining the spring under compression. Release of the handle unit establishes an abutment for the compressed spring upon release of the thermocouple unit, and the end of the abutment frictionally engages the thermocouple unit to inhibit relative rotational movement between the mounting cap and the thermocouple unit.

11 Claims, 8 Drawing Figures

PATENTED AUG 21 1973 3,753,787
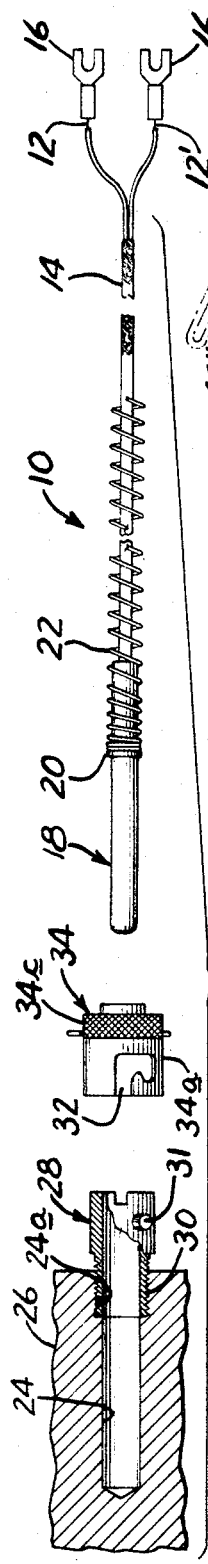
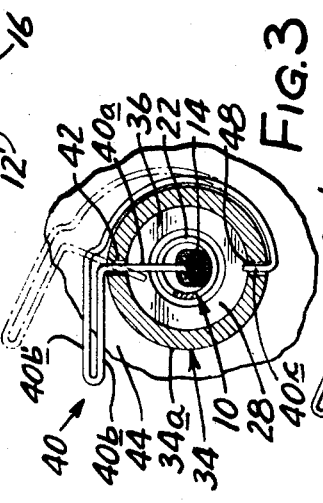
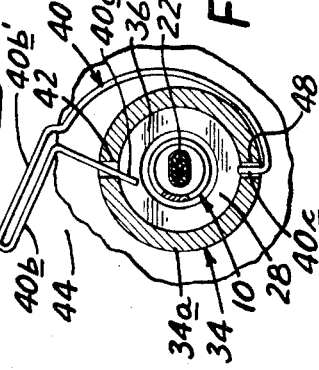
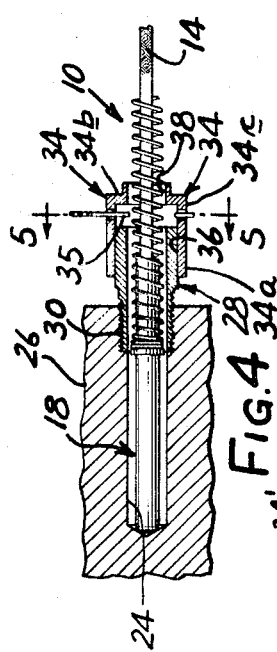
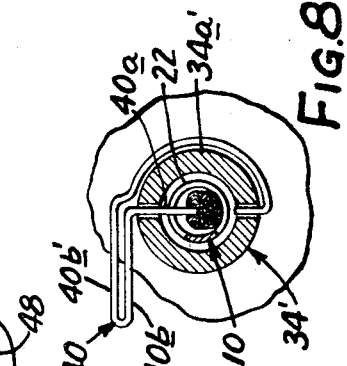
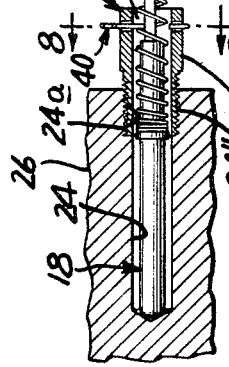
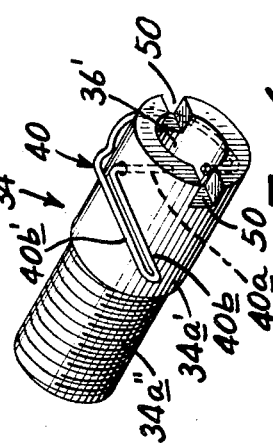
INVENTOR
WINFIELD SCOTT WEBB
by: Wallenstein, Spangenberg, Hattis
 + Strampel
ATTYS.

SPRING LOADED THERMOCOUPLE UNIT AND MOUNTING CAP THEREFOR

This invention relates to a spring-loaded thermocouple unit and mounting cap therefor for mounting the same in bores of various depths, where the front or inner end of the thermocouple unit is to be resiliently urged against the inner end wall of the bore. The mounting cap is mounted directly, or with an adaptor unit, adjacent to the outer end of the bore and forms an abutment for a compressed coil spring encircling the front end portion of the thermocouple unit.

The coil spring of the above described thermocouple unit has a length so as to encompass a longitudinal extent of the thermocouple unit so at least a portion of the coil spring in a compressed state will be at the front end portion of the bores of varying depths in which the thermocouple unit is designed to be mounted, where it can abut against a portion of the mounting cap secured at the front of any of the selected bores. The mounting cap is desirably related to the spring so that the abutment-forming part thereof can assume any one of a number of different axial positions with respect thereto. To this end one mounting cap design heretofore developed was, in effect, threaded on the coil spring so it could act as an abutment for any of the turns thereof when it was anchored in place at the outer end of the bore.

With this and other heretofore developed adjustable spring-loaded thermocouple units and mounting caps therefore there was always the possibility that the thermocouple unit could rotate relative to the mounting cap and thereby loosen the anchoring force on the thermocouple unit and it was a tedious and time consuming operation to adjust the position of the mounting cap along the coil spring.

It is one of the objects of the invention to provide an adjustable, spring-loaded thermocouple unit and mounting cap therefor which can be mounted in bores of widely varying depths and wherein the time and/or effort required to adjust the relative axial position of the mounting cap and the coil spring encircled thermocouple unit is greatly reduced from that previously required.

Another object of the invention is to provide an adjustable spring-loaded thermocouple unit and mounting cap therefor which are so constructed and related as to inhibit or prevent relative rotational motion between the mounting cap and the coil spring encircled thermocouple unit which could loosen the degree of compression of the spring.

A still further object of the invention is to provide an adjustable spring-loaded thermocouple unit and mounting cap therefor which satisfies both of the above mentioned objectives while being of such a construction that it can be manufactured to sell at a price comparable to that of adjustable spring-loaded thermocouples and mounting caps heretofore made.

In accordance with one of the features of the invention, the mounting cap is uniquely designed to include a retractable coil spring abutment-forming means which, by the simple expedient of moving a readily accessible handle means, retracts the abutment-forming means from it normal position where it extends across the mounting cap passageway to a point near the side thereof beyond the space to be occupied by the coil spring, where the coil spring encircle thermocouple unit may be moved to any desired axial position within the mounting cap. Release of the handle means causes the abutment forming means to return, preferably under a spring tension, to a position where it preferably presses against the thermocouple unit at a point between a pair of adjacent turns of the coil spring, the innermost of which abuts against the abutment-forming means.

The retractable abutment-forming means is most advantageously the inner end portion of a wire-like member which inner end portion most advantageously joins the base portion of a laterally outwardly projecting handle-forming portion of the wire-like member which doubles back on itself, then encircles a portion of the outer surfaces of the mounting cap and terminates in an outer end portion anchored in place in an opening in the mounting cap. When the thermocouple unit is positioned within the mounting cap passageway the abutment-forming inner end portion of the wire-like member frictionally resiliently engages the rough outer surface of the thermocouple unit (which may be a metallic braiding to inhibit or prevent relative rotation between the mounting cap which carries the wire-like member and the thermocouple unit. The abutment-forming inner end portion of the wire-like member can be retracted by simply raising handle-forming portion of the wire-like member which acts as a tensed spring which when released forces the inner abutment-forming end portion of the wire-like member once again against the rough outer surface of the thermocouple unit.

There are two forms of the invention, namely one wherein the mounting cap is secured to an adaptor unit in turn threaded into or otherwise secured to the bore-containing body. In such case, the mounting cap may be a bayonet-type fitting or the like which engages with the adaptor unit. In the most preferred form of the invention, an adaptor unit is not required and the mounting cap has a threaded inner end portion adapted to thread within the outer portion of the mounting bore. In either case, the coil spring encircled front end portion of the thermocouple unit may be passed through the mounting cap when the abutment means is held in its retracted position and securely mounted within the bore in the same manner previously described.

The above and other objects, advantages and features of the invention will become apparent upon making reference to the specification to follow, the claims and the drawings wherein:

FIG. 1 is an exploded view of a coil spring encircled thermocouple unit, a mounting cap therefor and an adaptor unit, where the mounting cap includes a bayonet-type fitting engageable with the adaptor unit shown threaded into the outer section of a bore within which the thermocouple unit is to be mounted;

FIG. 2 shows the final assembly of the adaptor unit threaded within the outer section of the bore and the coil spring encircled thermocouple unit resiliently pressed against the inner wall of the bore and held in place by the bayonet type mounting cap shown in FIG. 1;

FIG. 3 is an enlarged transverse sectional view through the assembly shown in FIG. 2 taken along section line 3—3 therein;

FIG. 4 is a view corresponding to FIG. 3 showing the relationship of the parts thereof where a lift handle on the mounting cap has been raised;

FIG. 5 is an enlarged transverse sectional view through the assembly shown in FIG. 3, taken along section line 5—5 therein;

FIG. 6 illustrates a perspective view of a modified mounting cap designed to be threaded directly into the outer section of the bore in which the thermocouple unit is to be mounted and to receive a coil spring encircling thermocouple unit like that shown in FIGS. 1–5;

FIG. 7 shows a longitudinal sectional view through the mounting cap of FIG. 6 threaded into the outer section of a bore, and receiving a coil spring encircled thermocouple unit mounted in place within the bore; and FIG. 8 is an enlarged transverse sectional view through the assembly shown in FIG. 7, taken along section line 8—8 therein.

Referring now particularly to the invention shown in FIGS. 1–5, a thermocouple unit generally indicated by reference numeral 10 is thereshown comprising a pair of insulated thermocouple conductors 12–12' encased within a braided jacket 14 or the like. The outer ends of the thermocouple conductors 12–12' terminate in a suitable connectors 16 which enables the same to be connected into a circuit. As is conventional, the inner ends of the conductors terminate within a rigid tube 18 or the like which may be made of stainless steel and which forms an enclosure for the inner end portion of the thermocouple unit. A retaining ring 20 surrounds the inner end of the tube 18 and forms an abutment for a coil spring 22 which extends axially for an appreciable distance in loose encircling relationship to the braided jacket 14 of the thermocouple unit. The coil spring encompasses a longitudinal extent of the thermocouple unit so that at least a portion of the coil spring in a partially compressed state will be located at the outer end portion of a bore, like the bore 24 shown in FIGS. 1 and 2, formed in a body 26 whose temperature is to be indicated by the voltage generated by the thermocouple unit 10 in a well known manner.

An adaptor unit 28 is shown with a threaded shank portion 30 threading into the threaded outer section 24a of the bore 24. The adaptor unit 28 is shown with a bayonet joint-forming projection 31 adapted to fit within a bayonet joint-forming slot 32 in a mounting cap 34. The mounting cap 34 is constructed so as to anchor the thermocouple unit in place in the manner shown in FIG. 2, where the outer end portion of the tube 18 of the thermocouple unit is resiliently urged against the inner wall of the bore 24, with the coil spring 22 under compression and sandwiched between an abutment shoulder 35 formed by an abutment means to be described and the retaining ring 20.

In the exemplary form of the invention shown in the drawings, the mounting cap 34 is a member preferably made of a metal such as stainless steel and including a cylindrical skirt portion 34a in which the bayonet slot 32 is formed and which defines a cylindrical space 36 therein which is fully open at one end and partially closed by an annular end wall 34b defining an opening 38 communicating with the cylindrical space 36 so as to form an overall open-ended passageway which receives the coil spring encircled thermocouple unit 10. The outer surface of the cylindrical skirt 34a of the mounting cap is knurled at 34c so that the mounting cap can be readily rotated to effect the interlocking of the bayonet joint formed between the mounting cap 34 and the adaptor unit 28.

The aforementioned abutment means forming the shoulder 35 of the mounting cap 34 is most desirably (although not necessarily) formed by the inner end portion 40a of a piece of spring metal of wire-like configuration generally indicated by reference numeral 40. The abutment-forming inner end portion 40a of the wire-like member 40 passes out of an opening 42 (FIG. 3) formed in the cylindrical skirt 34a of the mounting cap 10 where it merges with a sharply bent outwardly tangentially extending portion to provide a finger-receiving space 44 between the wire-like member and the outer cylindrical surface of the skirt portion 34a of the mounting cap 34. The outwardly extending portion 40b of the wire-like member 40 joins a reversely bent or doubled-back portion 40b' which together with the portion 40b form a handle which may be readily raised to retract the abutment-forming inner end portion 40a from the center portion of the mounting cap space 36. The bent back portion 40b' of the wire-like member 40 then extends closely around a substantial portion of the circumference of the skirt portion 34a of the mounting cap 34, where it terminates in a short transversely extending end portion 40c which passes through an opening 48 in the skirt 34a of the mounting cap at a point preferably diametrically opposite the aforementioned opening 42. The short transversely extending portion 40c of the wire-like 40 is suitably anchored in place within the opening 48 as by a resilient interlocking fit or by soldering the same therein.

As shown in dashed lines in FIG. 3 and in solid lines in FIG. 5, when the handle-forming portions 40b–40b' of the wire-like member 40 are fully raised, the wire-like member is placed under appreciable tension and the tip of the abutment-forming inner end portion 40a of the wire-like member 40 is at a point beyond the margins of the opening 38 in the annular end wall 34b of the mounting cap, where the coil spring carrying thermocouple unit can be readily moved longitudinally through the mounting cap. When the handle-forming portions 40b–40b' are released, the resiliency of the wire-like member returns the tip of the abutment-forming inner end portion 40a thereof into the center region of the mounting cap where it resiliently presses against braided jacket 14 of the thermocouple unit and forms the abutment shoulder against which a turn of the coil spring 22 bears. The rough surface of the braided jacket 14 creates sufficient friction between the braided jacket and the tip of the abutment-forming inner end portion 40a of the wire-like member 40 that the thermocouple unit cannot be rotated relative to the mounting cap 34 without the application of substantial force.

One way for mounting the thermocouple within the bore 24 is the following: The mounting cap 34 is first mounted on the adaptor unit 28 by grasping the knurled portion 34c of the mounting cap and turning the same to interlock the bayonet joint-forming portions of the mounting cap and the adaptor unit. The handle-forming portions 40b–40b' are raised with the fingers of one hand to retract the abutment-forming inner end portion 40a, so that the front coil spring carrying end of the thermocouple unit can be inserted into the mounting cap. The thermocouple unit is pushed forwardly with the other hand through the mounting cap to bring the tube 18 into secure contact with the end wall of the bore 24 and to place the coil spring 22 under some compression. While maintaining this spring under compression, the handle-forming portions 40b–40b' are released, resulting in the secure mounting of the thermocouple unit 10 within the bore 24 in the manner previously described.

Refer now more particularly to FIGS. 6-8 which show the preferred form of the invention. In this form of the invention, the adaptor unit 28 shown in the previously described embodiment is unnecessary, and a modified mounting cap 34' is utilized with the thermocouple unit 10 which mounting cap is designed to be threaded directly into the threaded outer section of the bore 24 in which the thermocouple unit is mounted. As best shown in FIG. 6, the modified mounting cap 34' thus has a cylindrical skirt portion 34a' which terminates in a threaded portion 34a'' which threads directly into the threaded outer section 24a of the bore 24, as shown in FIG. 7. The outer end of the mounting cap 34' is devoid of an annular wall present in the mounting cap 34, and is thus fully open to the outside of the mounting cap. A pair of screw-driver-receiving slots 50—50 are cut in the outer edges of the skirt portion 34a' of the mounting cap 34' so that a screwdriver can be readily inserted within the slots 50—50 to effect the threading and unthreading of the mounting cap in the threaded outer section of the bore 24. The shank portion 34a' of the mounting cap carries a wire-like member 40 which is identical in construction to the similar member 40 previously described and relates to the mounting cap 34' in the same manner as the similar member 40 relates to the mounting cap 34 previously described. Accordingly, the wire-like member 40 has handle - forming portions 40b–40b' and an abutment-forming inner end portion 40a which is retracted from a center position within a space 36' within the mounting cap 34' to to permit the ready passage of the coil spring encircled thermocouple unit 10 therein after the mounting cap 34' has been mounted within the bore 24. When the tube 18 at the end of the thermocouple unit 10 has been pressed against the inner end wall of the bore 24 and the coil spring 22 is slightly compressed, release of the handle-forming portions 40b–40b' automatically result in the secure mounting of the thermocouple unit 10 within the bore 24 in the manner previously described.

The present has thus provided an exceedingly simple and effective means for mounting a thermocouple unit within a bore of a selection of depths.

It should be understood that numerous modification may be made in the most preferred forms of the present invention without deviating from the broader aspects of the same.

I claim:

1. In combination with a thermocouple unit adapted to be inserted within bores of varying depths and including insulated thermocouple conductors terminating within a tube at the front end portion thereof to be pressed into firm engagement with an end wall of a bore or the like, a coil spring encircling the thermocouple unit and carried thereby so forward compression thereof will apply a forwardly directed force to the thermocouple unit, the coil spring encompassing a longitudinal extent of said thermocouple unit so that at least a portion of the coil spring in a compressed state spaced from the front end thereof will be adjacent to a mounting cap connecting point associated with bores of varying depths, the improvement comprising a thermocouple mounting cap having a longitudinally extending open-ended passageway therein adapted to receive said coil spring and thermocouple unit extending therein, said mounting cap having means for anchoring the same with respect to the outer end of a bore in which said thermocouple unit is to be mounted, and a thin elongated member made of a resilient material and having a first end portion forming an abutment for said coil spring when compressed toward the front of said thermocouple unit resiliently to hold the thermocouple unit in place against the inner wall of a bore, said end portion of said thin elongated member extending laterally within said passageway where it intercepts a portion of said coil spring, a liftable handle-forming means on the outside of said cap and formed by a lateral extension of said end portion of said thin elongated member and terminating in a second end portion which extends substantially around the outside of the mounting cap where the end thereof is anchored to said cap for providing sufficient flexibility thereto that said handle - forming means can be readily raised to a point where said abutment - forming end portion can be removed from between the turns of said coil spring, the resiliency of said thin elongated member resiliently urging said first abutment forming end portion of said thin elongated member into a center portion of said mounting cap passageway, where it intercepts said coil spring, said handle-forming means when lifted moving said first end portion of said resilient thin elongated member away from said coil spring to provide clearance for the relative longitudinal movement of said thermocouple unit and attached coil spring, on the one hand, and the mounting cap, on the other hand.

2. The combination of claim 1 wherein said abutment-forming first end portion of said thin elongated member and said handle-forming means are different parts of a single wire-like member, and the handle-forming means is formed by a folded back intermediate portion of the wire-like member with said abutment being a transverse extension of said folded back intermediate portion of said single wire-like member.

3. The combination of claim 1 wherein said retractable abutment means has an inner end positioned to make frictional contact with the thermocouple unit to inhibit relative rotational movement therebetween.

4. The combination of claim 1 wherein said thermocouple unit includes an outer rough surfaced jacket portion encompassed by the portions of said coil spring to be opposite the outer end of said bores of varying depth, said inwardly extending and urged abutment means resiliently urged against said rough surfaced jacket portion making a locking contact therewith to inhibit relative rotational movement therebetween.

5. The combination of claim 1 wherein said mounting cap has a threaded inner shank portion to be directly threaded into a threaded outer portion of a bore into which it is to be mounted.

6. The combination of claim 1 wherein there is provided an adaptor unit which has a threaded inner shank portion to be directly threaded into a threaded outer portion of a bore into which it is to be mounted and a bayonet joint-forming outer portion, and said mounting cap having a bayonet joint-forming inner portion complementary and interlockable with the said bayonet joint-forming outer portion of said adaptor unit.

7. A thermocouple mounting cap for mounting a coil spring encircled theremocouple unit firmly within a bore having a selection of depths, said mounting cap having a longitudinally extending passageway therein adapted to receive a coil spring encircled thermocouple unit extending therethrough, said mounting cap having means for anchoring the same at the outer end of said bore on which the thermocouple unit is to be mounted, and abutment means forming an abutment for the coil spring when the thermocouple unit has been pushed through the longitudinal passageway of the mounting cap into a position firmly engaging the inner end of the bore, said abutment means being resiliently urged laterally inwardly within the passageway to a point therein at which it can intercept a turn of said coil spring, the abutment means being manually retractable to provide clearance for the longitudinal movement of said thermocouple unit through said passageway, a handle-forming means on the outside of said cap which means is manually movable outwardly to retract said abutment means against a resilient restraining force, so release thereof will cause the extension of the abutment means into the center portion of said passageway, and said abutment and handle-forming means being different parts of the same wire-like member, the handle-forming means being formed by a folded back intermediate portion of the wire-like member with said abutment means being a transverse extension of said folded back intermediate portion of said wire-like member, the end of said wire-like member remote from the end forming said abutment means being anchored to said mounting cap at a point substantially spaced from said handle-forming means for providing sufficient flexibility thereto that said handle-forming means can be readily raised to a point where said abutment forming means can be removed from between the turns of said coil spring.

8. The mounting cap of claim 7 wherein said wire-like member is anchored at its outer end to the mounting cap by an inturned end portion anchored in an opening in said mounting cap and extends from its anchored end part way circumferentially around the mounting cap where it projects outwardly therefrom, said abutment means projecting transversely of the folded back portion of said wire-like member at a point spaced from the outer end thereof and passing through an opening in the mounting cap into the mounting cap passageway.

9. The mounting cap of claim 7 wherein the mounting cap has a cylindrical shank portion open at the opposite ends thereof to define said open-ended passageway thereof, and the inner end of said shank portion being threaded where it can be anchored directly within the corresponding threaded portion of a bore in which the thermocouple unit is to be mounted.

10. In combination, a thermocouple unit adapted to be inserted within bores of varying depths and including a jacket in which extend insulated thermocouple conductors terminating within a tube at the front end portion of said jacket, said tube to be pressed into firm engagement with an end wall of a bore, a coil spring carried by and encircling the jacket of said thermocouple unit and carried thereby so the forward compression thereof will apply a forwardly directed force to the thermocouple unit, the coil spring encompassing a longitudinal extent of said jacket so that at least a portion of the coil spring in a compressed state spaced from the front end thereof will be adjacent to a mounting cap connecting point associated with bores of varying depths, and a thermocouple mounting cap having a longitudinally extending open-ended passageway therein adapted to receive said coil spring and thermocouple unit extending therein, said mounting cap having means for anchoring the same with respect to the outer end of a bore in which said thermocouple unit is to be mounted, and releasable thermocouple unit position fixing means having a first end portion forming an abutment for said coil spring when compressed toward the front of said thermocouple unit resiliently to hold the thermocouple unit in place against the inner wall of a bore, said end portion of said means extending laterally within said passageway and being inwardly resiliently urged into positive engagement with said thermocouple unit jacket, said thermocouple unit jacket and inwardly resiliently urged end portion of said means making positive engagement for preventing relative rotational movement therebetween, said means having a manually engageable portion on the outside of side mounting cap and connected to said end portion of said means for moving said end portion outwardly to withdraw said end portion from the turns of the coil spring to provide clearance for the relative longitudinal movement of said thermocouple unit and attached coil spring, on the one hand, and the mounting cap, on the other hand, the release of the retracted end portion of said means once again establishing an abutment for the coil spring.

11. The combination of claim 10 wherein the locking engagement between the end portion of said means and the jacket of the thermocouple unit is obtained by a frictional engagement therebetween effected by the provision of a rough surface.

* * * * *